(12) United States Patent
Löhr et al.

(10) Patent No.: US 10,880,737 B2
(45) Date of Patent: *Dec. 29, 2020

(54) METHOD AND APPARATUS FOR REFRESHING THE SECURITY KEYS OF A SUBSET OF CONFIGURED RADIO BEARERS

(71) Applicant: Motorola Mobility LLC, Chicago, IL (US)

(72) Inventors: Joachim Löhr, Wiesbaden (DE); Prateek Basu Mallick, Langen (DE); Andreas Kunz, Ladenburg (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/016,590

(22) Filed: Jun. 23, 2018

(65) Prior Publication Data
US 2018/0376331 A1 Dec. 27, 2018

Related U.S. Application Data

(60) Provisional application No. 62/524,379, filed on Jun. 23, 2017.

(51) Int. Cl.
*H04L 29/00* (2006.01)
*H04W 12/04* (2009.01)
(Continued)

(52) U.S. Cl.
CPC ....... *H04W 12/0401* (2019.01); *H04L 1/1893* (2013.01); *H04L 9/0819* (2013.01);
(Continued)

(58) Field of Classification Search
CPC . H04W 12/04; H04W 76/25; H04W 12/0403; H04W 12/0401; H04W 76/22;
(Continued)

(56) References Cited

U.S. PATENT DOCUMENTS 10,028,311 B2 * 7/2018 Yi ........................ H04L 67/1078
10,116,685 B2 10/2018 Basu Mallick et al.
(Continued)

FOREIGN PATENT DOCUMENTS

EP 2574103 A1 3/2013
EP 2928261 A1 10/2015
(Continued)

OTHER PUBLICATIONS

PCT International Search Report for PCT/US2018/039183, Motorola Mobility LLC, dated Oct. 8, 2018.
(Continued)

*Primary Examiner* — Don G Zhao
(74) *Attorney, Agent, or Firm* — Loppnow & Chapa

(57) ABSTRACT

A method and apparatus for refreshing the security keys of a subset of configured radio bearers including less than all of the currently configured radio bearers is provided. An indication is received from a network entity to release one or more radio bearers from the subset of configured radio bearers for which the refresh of security keys is desired. A new radio bearer is added for each of the one or more radio bearers being released. Each of the new radio bearers is added with new security keys.

17 Claims, 8 Drawing Sheets

(51) Int. Cl.
  *H04W 72/04* (2009.01)
  *H04L 9/08* (2006.01)
  *H04L 1/18* (2006.01)
  H04W 36/00 (2009.01)
  H04W 76/32 (2018.01)

(52) U.S. Cl.
  CPC ... *H04W 12/0403* (2019.01); *H04W 72/0453* (2013.01); *H04L 2209/80* (2013.01); *H04W 36/0038* (2013.01); *H04W 76/32* (2018.02)

(58) Field of Classification Search
  CPC ............. H04W 36/0038; H04L 9/0819; H04L 2209/80
  See application file for complete search history.

(56) References Cited

U.S. PATENT DOCUMENTS

| | | | |
|---|---|---|---|
| 10,555,362 | B2 | 2/2020 | Quan et al. |
| 2006/0034205 | A1* | 2/2006 | Kim .................. H04W 76/40 370/312 |
| 2013/0170474 | A1 | 7/2013 | Bi et al. |
| 2015/0092696 | A1* | 4/2015 | Liu ................. H04W 12/0017 370/329 |
| 2015/0264612 | A1 | 9/2015 | Baek et al. |
| 2016/0065700 | A1* | 3/2016 | Yi ................... H04W 12/0013 370/328 |
| 2016/0157101 | A1* | 6/2016 | Do ........................ H04W 12/10 455/410 |
| 2016/0234847 | A1* | 8/2016 | Zhang .................. H04W 76/15 |
| 2016/0338092 | A1* | 11/2016 | Agiwal ............. H04W 72/1289 |
| 2017/0272985 | A1 | 9/2017 | Axen et al. |
| 2017/0332440 | A1 | 11/2017 | Xu et al. |
| 2017/0353992 | A1 | 12/2017 | Quan et al. |
| 2018/0152939 | A1* | 5/2018 | Lee .................... H04L 1/1812 |
| 2018/0247082 | A1* | 8/2018 | Durham .................... G06F 8/63 |
| 2018/0332554 | A1 | 11/2018 | Kawasaki et al. |
| 2018/0376331 | A1* | 12/2018 | Lohr ..................... H04L 1/1893 |
| 2019/0124710 | A1 | 4/2019 | Stattin et al. |
| 2019/0253895 | A1* | 8/2019 | Xu ........................ H04W 12/06 |
| 2020/0084828 | A1* | 3/2020 | Loehr ............... H04W 74/0833 |

FOREIGN PATENT DOCUMENTS

| | | |
|---|---|---|
| WO | 2013173988 A1 | 11/2013 |
| WO | 2015176462 A1 | 11/2015 |
| WO | 2016119183 A1 | 8/2016 |

OTHER PUBLICATIONS

PCT International Search Report for PCT/US2018/039184, Motorola Mobility LLC, dated Oct. 8, 2018.
3GPP TS 33.401 V15.0.0 (Jun. 2017), 3rd Generation Partnership Project, Technical Specification Group Services and System Aspects, 3GPP System Architecture Evolution (SAE), Security Architecture (Release 15).
3GPP TS 36.323 V14.1.0 (Dec. 2016), 3rd Generation Partnership Project, Technical Specification Group Radio Access Network, Evolved Universal Terrestrial Radio Access (E-UTRA), Packet Data Convergence Protocol (PDCP) Specification (Release 14).
3GPP TS 36.331 V143.0 (Jun. 2017), 3rd Generation Partnership Project, Technical Specification Group Radio Access Network, Evolved Universal Terrestrial Radio Access (E-UTRA), Radio Resource Control (RRC), Protocol Specification (Release 14).
3GPP TS 38.322 V0.0.2 (May 2017), 3rd Generation Partnership Project, Technical Specification Group Radio Access Network, NR, Radio Link Control (RLC) Protocol Specification (Release 15).
PTO-892 from Non-Final Office Action, dated May 11, 2020 for U.S. Appl. No. 16/016,592, Basu Mallick et al.

* cited by examiner

METHOD AND APPARATUS FOR REFRESHING THE SECURITY KEYS OF A SUBSET OF CONFIGURED RADIO BEARERS

FIELD OF THE INVENTION

The present disclosure is directed to a method and apparatus for refreshing the security keys of a radio bearer, and more particularly to a refresh of the security keys through the release of an existing radio bearer and an addition of a new radio bearer.

BACKGROUND OF THE INVENTION

Presently, user equipment, such as wireless communication devices, communicate with other communication devices using wireless signals. To facilitate the communication, the wireless signals are often broadcast to an area in which the intended communication partner, as well as other observers of the wireless signals may be present. It is generally desirable for only the intended parties of the communication to be able to discern the information that is being conveyed. So, the information itself is often at least sometimes encrypted, where the keys to the decryption are generally only known to the sender and the intended recipient of the communication.

Some wireless communication devices will maintain multiple connections and/or communication channels with one or more communication targets. This may be the result of the presence and operation of one or more user applications within the device, that may each require the ability to transmit or receive information. In turn this can result in multiple bearers being created and maintained in a particular device, which each may require one or more forms of security in order to insure the privacy and/or integrity of the information being conveyed. In many wireless environments, a communication connection may be managed relative to a communication standard, which defines the details that must be agreed upon and understood to facilitate a more seamless connection. These agreed upon details will often include the details related to the security of the wireless communications. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In some instances, a wireless communication device may be currently connected to one or more communication targets using multiple different standards. Still further, some communication connections may involve multiple types of networks via which data related to the connection can be conveyed, where each network can have its own standard. In at least some instances, this may be referred to as dual connectivity. Even with some forms of dual connectivity, a particular communication connection may be focused more exclusively with a connection to a particular one of the multiple types of networks. In other instances, a communication connection may route information through multiple networks. In each of these and other instances an understanding as to how the security will be managed for each of the bearers can be important. Some systems may attempt to use the same manner of security for all communication bearers associated with a particular wireless communication device. Other systems may apply and manage a different form of security relative to each different communication bearer. Whichever manner is selected has the potential to impact different aspects of the communication connection differently, including if and when the security keys associated with a particular bearer might need to be refreshed.

The present inventors have recognized, that the keys for a selected subset of existing radio bearers can be caused to change by releasing one or more existing radio bearers and adding a corresponding number of new radio bearers in place of the released radio bearers.

SUMMARY

Presently, user equipment, such as wireless communication devices, communicate with other communication devices using wireless signals. According to a possible embodiment, a method in a user equipment to refresh the security keys of a subset of configured radio bearers including less than all of the currently configured radio bearers is provided. The method includes receiving an indication from a network entity to release one or more radio bearers from the subset of configured radio bearers for which the refresh of security keys is desired. The method further includes adding a new radio bearer for each of the one or more radio bearers being released. Each of the new radio bearers is added with new security keys.

In some embodiments, each radio bearer has a related packet data convergence protocol entity. In some of these instances, the packet data convergence protocol entity of the radio bearer being released, prior to being released, deciphers already received and processed information from the information flow, which has not yet been acknowledged as having been received, and transfers the deciphered information to the packet data convergence protocol entity of the new related radio bearer being added in ascending order of an associated count value, treating the deciphered information as newly arrived information via the new related radio bearer being added. It is additionally and/or alternatively possible that any information in a transmit buffer of a transmitter of the packet data convergence protocol entity of the radio bearer being released, which has not been acknowledged as having been received, will be processed again using the new security keys of the new related radio bearer being added, and the information that has been processed again will be retransmitted.

According to a possible embodiment, a user equipment to refresh the security keys of a subset of configured radio bearers including less than all of the currently configured radio bearers is provided. The user equipment includes a transceiver that receives an indication from a network entity to release one or more radio bearers from the subset of configured radio bearers for which the refresh of security keys is desired. The user equipment further includes a controller that adds a new radio bearer for each of the one or more radio bearers being released, with each of the new radio bearers being added with new security keys.

According to a possible embodiment, a method in a network entity to refresh the security keys of a subset of configured radio bearers including less than all of the currently configured radio bearers is provided. The method includes transmitting an indication to a user equipment to release one or more radio bearers from the subset of configured radio bearers for which the refresh of security keys is desired. The method further includes adding a new radio bearer for each of the one or more radio bearers being released. Each of the new radio bearers is added with new security keys.

According to a possible embodiment, a network entity to refresh the security keys of a subset of configured radio bearers including less than all of the currently configured radio bearers is provided. The network entity includes a transceiver that transmits an indication to a user equipment to release one or more radio bearers from the subset of configured radio bearers for which the refresh of security keys is desired. The network entity further includes a controller that adds a new radio bearer for each of the one or more radio bearers being released, with each of the new radio bearers being added with new security keys.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
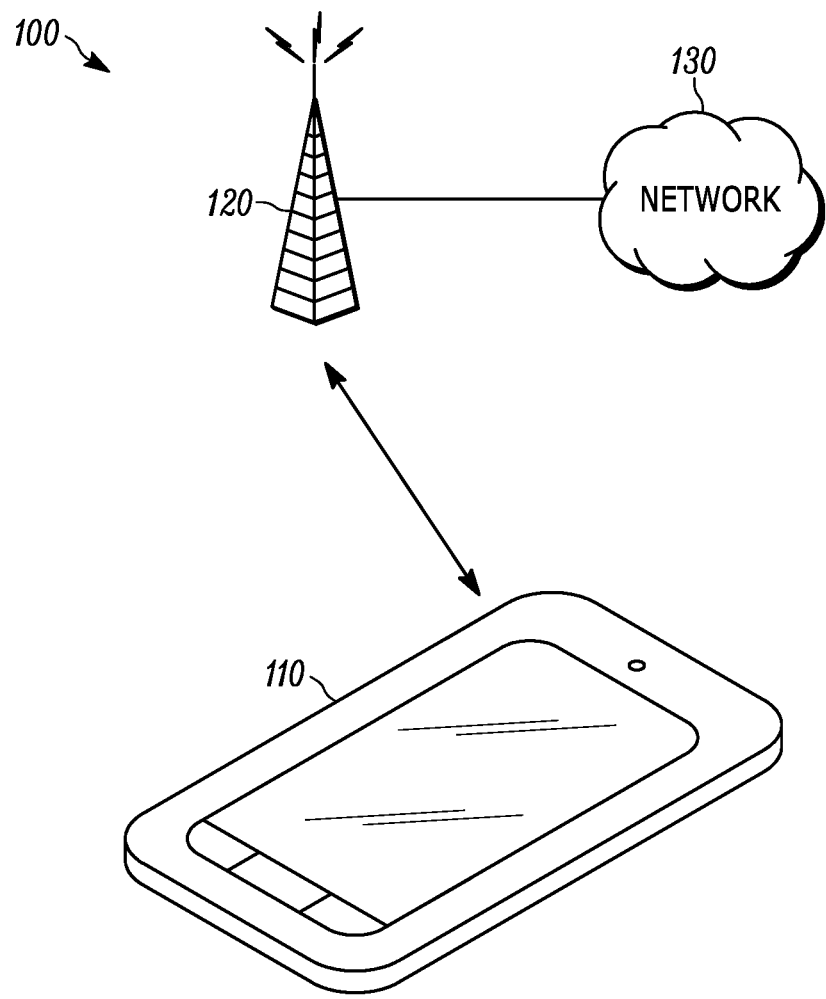
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for refreshing the security keys of a radio bearer.

FIG. 1 is an example block diagram of a system 100 according to a possible embodiment. The system 100 can include a wireless communication device 110, such as a User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In 5G NR system, for Evolved Universal Mobile Telecommunications System Terrestrial Radio Access Network New Radio Access Technology (E-UTRAN NR) Dual Connectivity (called ENDC) the following bearer types are supported: Master Cell Group (MCG) bearer, Secondary Cell Group (SCG) bearer, MCG split bearer and SCG split bearer. Radio layer 2 and Radio Layer 3 (RAN2) discussed recently the possibility to unify the different split bearer types. The final objective of unifying the split bearers should be such that from UE specification perspective, there is only one split bearer type, both from the control and user plane perspective. The aim of the bearer unification is to minimise the changes between MCG split bearer and SCG split bearer in order to reduce the standardization, implementation and testing effort and minimize the risk of market fragmentation. It has been proposed to introduce a security key per radio bearer compared to LTE where one security key is used for all radio bearers of a cell group (eNB). The motivation is to make the Packet Data Convergence Protocol (PDCP) location transparent to the UE.

In LTE, the Access Stratum (AS) applies three different security keys: one for the integrity protection of Radio Resource Control (RRC) signaling ($K_{RRCint}$), one for the ciphering of RRC signaling ($K_{RRCenc}$) and one for the ciphering of user data ($K_{UPenc}$). All three AS keys are derived from the $K_{eNB}$ key. The $K_{eNB}$ is based on the $K_{ASME}$ key, which is handled by upper layers.

Figure 2:
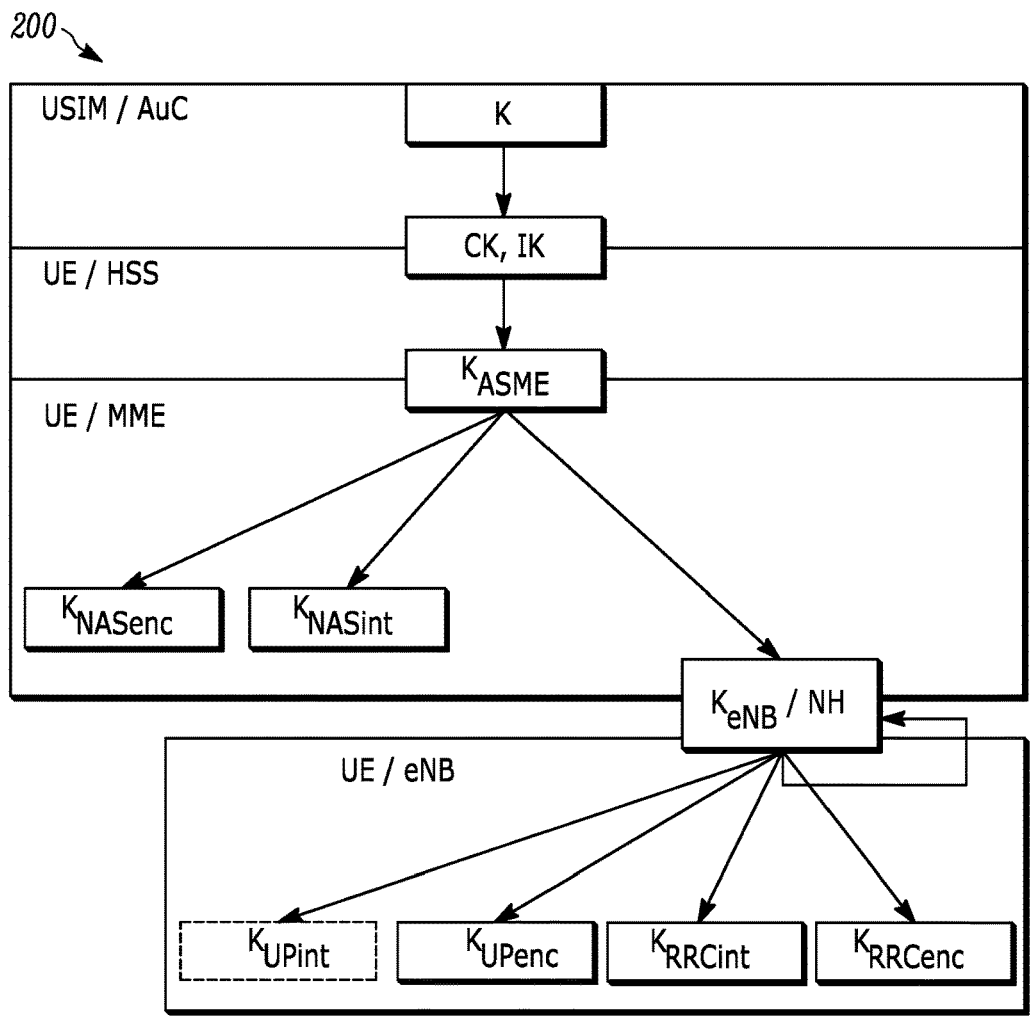
FIG. 2 is a block diagram of the key hierarchy in an exemplary system, such as a Long Term Evolution (LTE) system.
Figure 6:
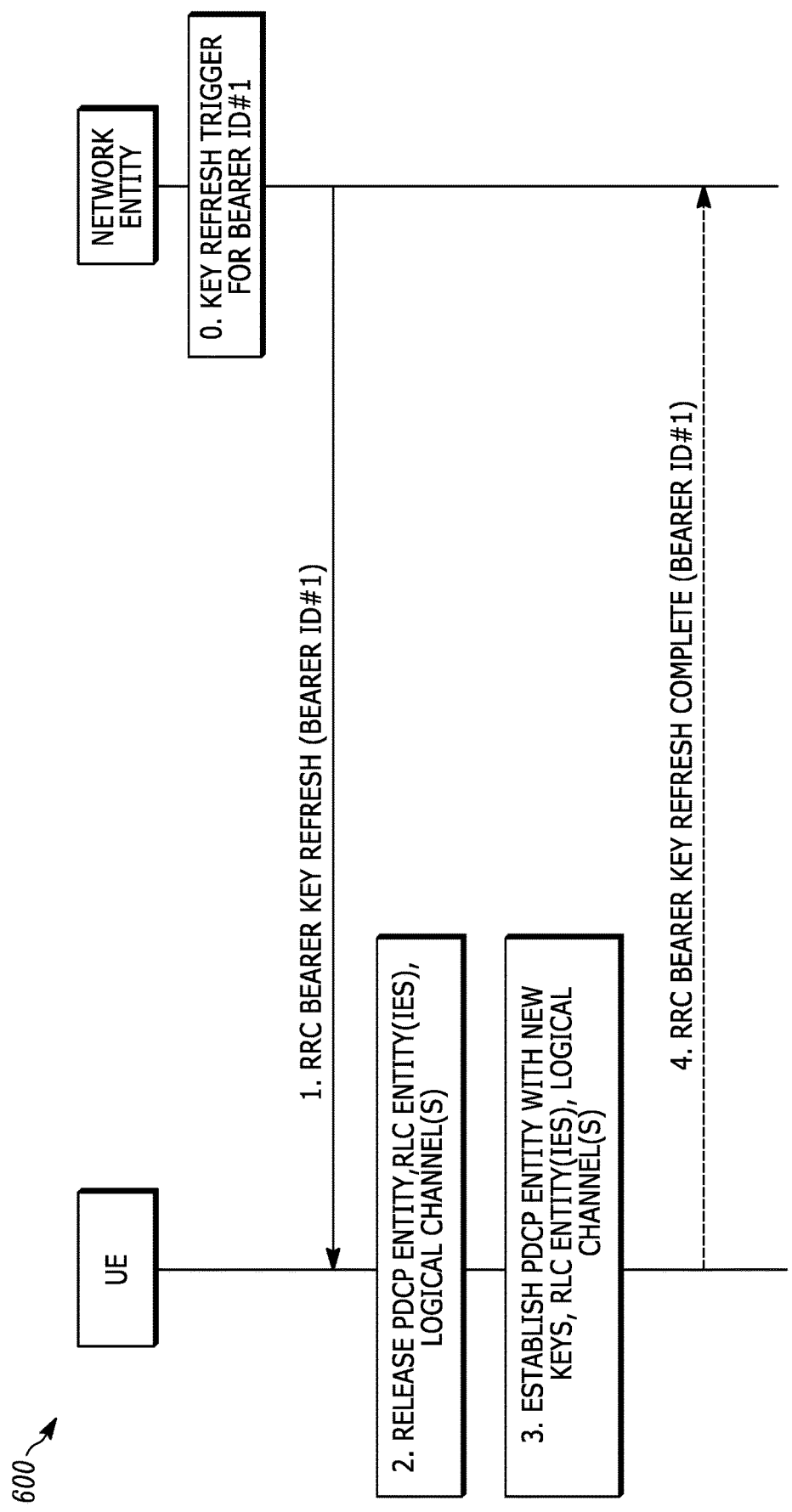
FIG. 6 is a message sequence diagram for changing the security key(s) for a radio bearer, in accordance with at least a further embodiment.

The key hierarchy for LTE is described in Third Generation Partnership Project (3GPP) Technical Specification (TS) 33.401, FIGS. 6.2-1, which has been reproduced in the present application as FIG. 2. FIG. 2 illustrates a block diagram 200 of the key hierarchy in an exemplary system, such as a Long Term Evolution (LTE) system.

The integrity and ciphering algorithms can generally be changed upon handover. The four AS keys ($K_{eNB}$, $K_{RRCint}$, $K_{RRCenc}$ and $K_{UPenc}$) generally change upon every handover, connection re-establishment and connection resume. The keyChangeIndicator is used upon handover and indicates whether the UE should use the keys associated with the $K_{ASME}$ key taken into use with the latest successful Non Access Stratum (NAS) Security Mode Command (SMC) procedure. The nextHopChainingCount parameter is used upon handover, connection re-establishment and connection resume by the UE when deriving the new $K_{eNB}$ that is used to generate $K_{RRCint}$, $K_{RRCenc}$ and $K_{UPenc}$ (see 3GPP TS 33.401 3GPP, "System Architecture Evolution (SAE); Security architecture", v15.0.0, Jun. 14, 2017). An intra cell handover procedure may be used to change the keys in RRC_CONNECTED.

For each radio bearer, an independent counter (COUNT, as specified in TS 36.323) is maintained for each direction. For each Data Radio Bearer (DRB), the COUNT is used as input for ciphering. For each Signaling Radio Bearer (SRB), the COUNT is used as input for both ciphering and integrity protection. It is generally not allowed to use the same COUNT value more than once for a given security key.

In case of Dual connectivity, a separate $K_{eNB}$ is used for SCG-DRBs (S-$K_{eNB}$). This key is derived from the key used for the MCG ($K_{eNB}$) and an SCG counter that is used to ensure freshness. To refresh the S-$K_{eNB}$, such as when the COUNT will wrap around, E-UTRAN employs an SCG change, i.e. an RRCConnectionReconfiguration message including mobilityControlInfoSCG. When performing handover, while at least one SCG-DRB remains configured, both $K_{eNB}$ and S-$K_{eNB}$ are refreshed. In such a case, the Evolved Universal Mobile Telecommunications System Terrestrial Radio Access Network (E-UTRAN) performs a handover with an SCG change, such as for an RRCConnectionReconfiguration message including both mobilityControlInfo and mobilityControlInfoSCG. The ciphering algorithm is common for all radio bearers within a Cell Group (CG) but may be different between MCG and SCG. The ciphering algorithm for SCG DRBs can generally only be changed upon SCG change.

As mentioned above, in LTE a wrap-around of the COUNT for one radio bearer will affect all radio bearers of the eNB, since $K_{eNB}$/S-$K_{eNB}$ needs to be refreshed, i.e. security algorithm for all radio bearers of the cell group are refreshed. However for NR, the aim is to allow the change of security key(s) for one radio bearer, such as due to wrap around of COUNT, without affecting the other radio bearers. The present disclosure outlines several methods for the security key change procedure of a radio bearer. In particular, several embodiments on the layer 2 handling at security key refresh/change are disclosed.

In the following, the term eNB/gNB is used for the base station but it is replaceable by any other radio access node, e.g. Base Station (BS), eNB, gNB, Access Point (AP), NR etc. Further, the proposed method is applicable also to other types of networks including IEEE 802.11 variants, GSM, General Packet Radio Service (GPRS), Universal Mobile Telecommunications System (UMTS), LTE variants, Code Division Multiple Access (CDMA) 2000, Bluetooth, Zig-Bee, Sigfoxx, etc.

Figure 3:
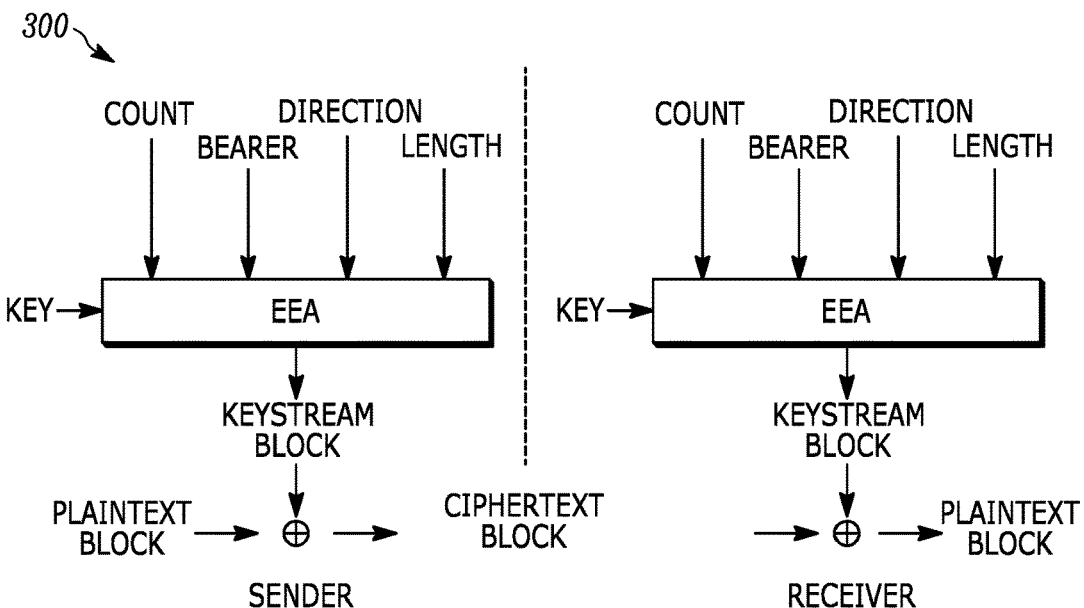
FIG. 3 is a block diagram for the ciphering of data, where a count value is an input of the ciphering.
Figure 4A:
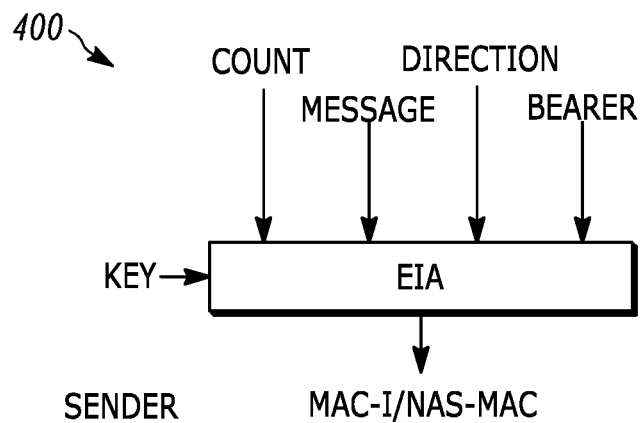
FIGS. 4A and 4B are block diagrams for the derivation of integrity protection signaling involving a count value is an input of the derivation, where FIG. 4A highlights the derivation for a sender, and FIG. 4B highlights the derivation for a receiver.
Figure 4B:
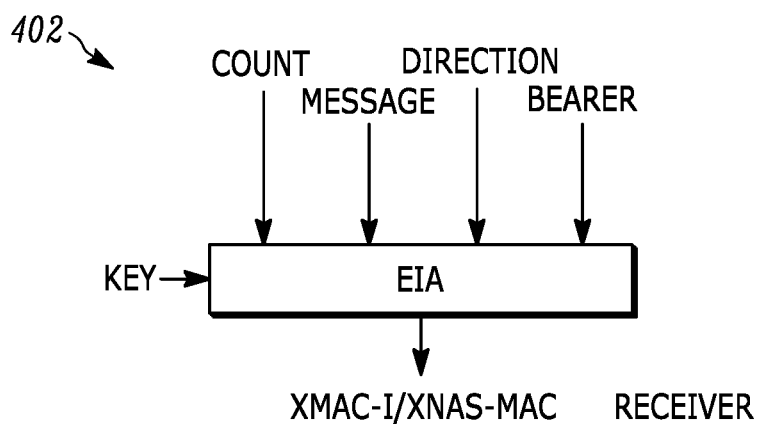

According to a possible embodiment, there are occasions such as but not limited to COUNT wrap-around where it may be desirable for the keys for ciphering and integrity protection of a Bearer to be changed. The "COUNT" is an input in the actual ciphering and integrity protection as shown in both FIG. 3, and FIGS. 4A and 4B. More specifically, FIG. 3 illustrates a block diagram 300 for the ciphering of data, where a count value is an input of the ciphering. FIGS. 4A and 4B illustrate block diagrams 400 and 402 for the derivation of integrity protection signaling involving a count value that is an input of the derivation, where FIG. 4A highlights the derivation for a sender, and FIG. 4B highlights the derivation for a receiver.

For each radio bearer, an independent counter (COUNT, as specified in 3GPP TS 36.323) is maintained for each direction. In LTE for each DRB, the COUNT is used as input for ciphering. For each SRB, the COUNT is used as input for both ciphering and integrity protection. It is typically not allowed to use the same COUNT value more than once for a given security key.

There may be various reasons why a certain bearer should change the current keys, while it would not be desirable to refresh the keys of the other bearers, for example a potential trigger could be a packet count for the bearer that is exceeded, a time count for the bearer that is exceeded, and/or different policies from higher layers that require more frequent or less frequent key changes depending on the application service.

According to one embodiment, the security key(s) of a radio bearer is changed by first releasing the radio bearer for which the security key(s) have to be changed and subsequently adding a new radio bearer. A Network entity (NE) such as a base station, eNB, gNB or the like, signals a bearer release message to the UE, ordering the UE to release the radio bearer identified by the radio bearer identity included in the release/reconfiguration message. The UE upon reception of the release message will according to certain embodiments release the PDCP entity, the Radio Link Control (RLC) entity or entities, the logical channel(s) of the radio bearer indicated by the radio bearer identity. The network entity (NE) also signals a radio bearer addition message to the UE, using Radio Resource Control (RRC) signaling. In response to receiving the radio bearer addition message from the NE, the UE establishes a PDCP entity and configures it with new security keys and in accordance with the received PDCP-Configuration contained in the radio bearer addition message. Furthermore, the UE establishes an RLC entity or entities in accordance with the received RLC-Configuration signaled in the radio bearer addition message. UE establishes a logical channel in accordance with the received logicalChannelIdentity and the received logicalChannelConfiguration signaled within the radio bearer addition message. According to one embodiment, the logical channel identity of the newly established logical channel is different from the logical channel identity of the radio bearer being released.

Figure 5:
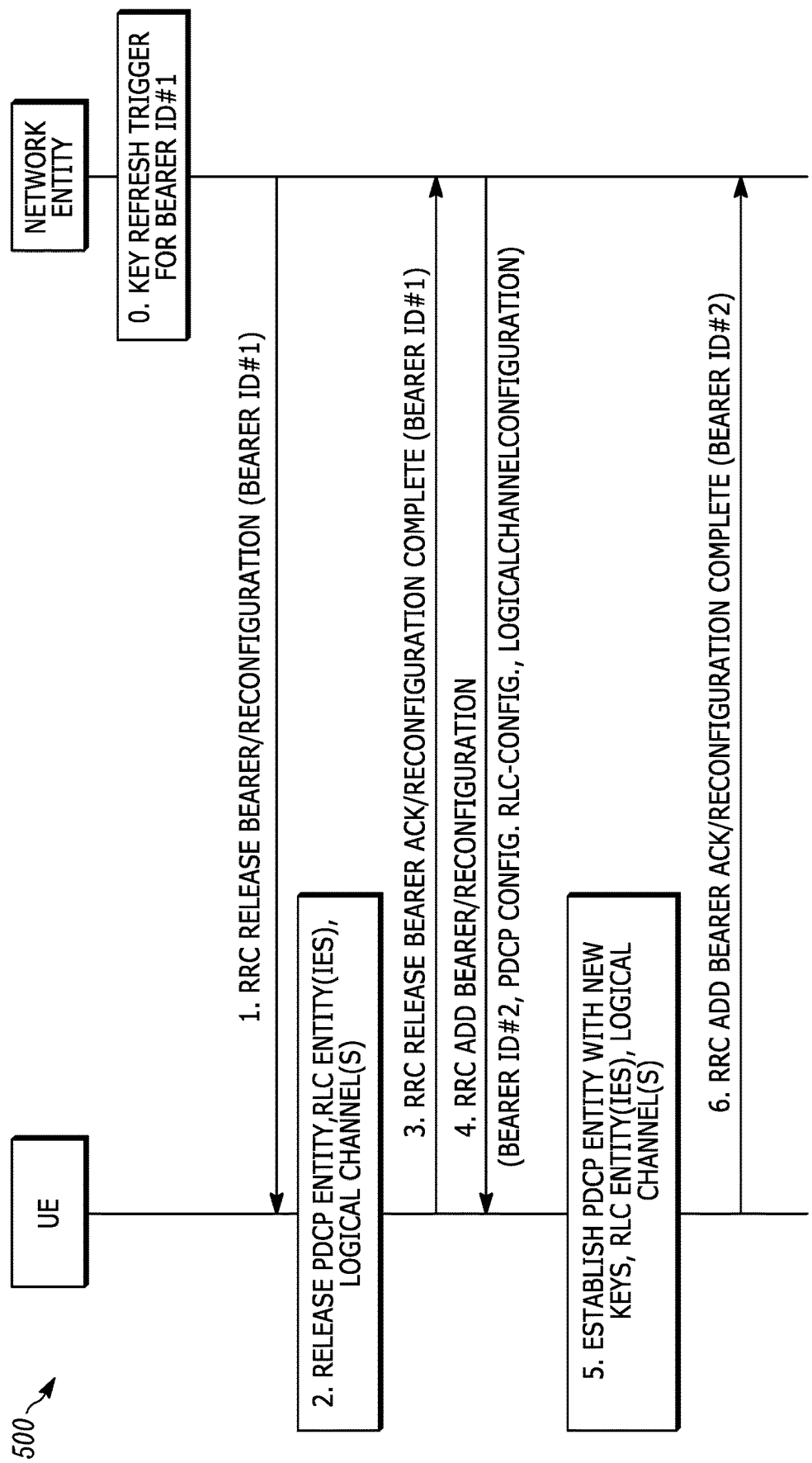
FIG. 5 is a message sequence diagram for changing the security key(s) for a radio bearer, in accordance with at least one embodiment.

FIG. 5 illustrates a message sequence diagram 500 for changing the security key(s) for a radio bearer, in accordance with at least one embodiment of the present application.

The Medium Access Control (MAC) is not reset in response to releasing the radio bearer and adding a new radio bearer. Since a new logical channel identity is used for the new radio bearer, the receiver e.g. the MAC entity just discards the packets of the old radio bearer respectively the packets received for the old logical channel identity, which is not configured anymore which are still subject to Hybrid Automatic Repeat Request (HARQ) retransmissions.

According to one embodiment, the radio bearer release and radio bearer addition is signaled in one message to the UE, i.e. one new RRC message, indicating specifically the key refresh of a particular bearer, and may add some security relevant parameters that would help the UE to derive the new keys. The UE may release, similar to the previous embodiment, the indicated bearer and add back a new bearer with the same configuration as the released bearer. The UE may acknowledge the RRC Bearer Key Refresh request. The following embodiments propose to send indications or parameters from the User Equipment (UE) to the Network Entity (NE), this RRC Bearer Key Refresh Complete message may be used to carry the information.

FIG. 6 illustrates a message sequence diagram 600 for changing the security key(s) for a radio bearer, in accordance with at least a further embodiment of the present application.

According to one embodiment, the UE first adds a new radio bearer before releasing the radio bearer for which security key(s) are to be changed. This will help to implicitly ensure that the bearer identity and the logical channel identity are different for the newly established radio bearer and the released radio bearer.

According to another embodiment, the UE moves PDCP SDU(s) from the old PDCP of the to be deleted radio bearer to the PDCP entity of newly added radio bearer. The PDCP entity of the radio bearer which will be deleted deciphers already processed PDCP PDUs which were not yet acknowledged and transfers them to the new PDCP entity in ascending order of the associated count value, which treats them as new arrived data.

The configuration of the PDCP/RLC entity of the added radio bearer may according to another embodiment be the same as the corresponding configuration of the released radio bearer except for the security configuration. According to another embodiment, the radio bearer identity and/or logicalChannelIdentity of the added radio bearer/logical channel may be different to the identities of the released radio bearer.

According to another embodiment, the NE signals a message to the UE indicating the change of the security key(s) for a radio bearer identified by a radio bearer identity. In response to receiving the message, the UE will perform a PDCP reconfiguration with new security configuration/keys. Based on the new security configuration, the UE will derive new security key(s). According to certain embodiments, the UE will perform a PDCP re-establishment. In the PDCP transmitter, the PDCP SDUs/PDUs stored in the transmission buffer are processed again after re-establishment with the new security key(s). From the first PDCP SDU for which the successful delivery of the corresponding PDCP PDU has not been confirmed by lower layers, the UE performs a retransmission or transmission of all the subsequent PDCP SDUs in ascending order. According to one embodiment, PDCP PDUs which were already processed and associated with a Sequence Number (SN) prior to the re-establishment are deciphered (with the old key) and ciphered again with the new security key. The UE will further perform a reset respectively a re-establishment of the RLC entity/entities associated with the indicated radio bearer. The UE will for example for the Radio Link Control (RLC) Acknowledged Mode (AM) discard the remaining AMD PDUs in the receiving side and discard all RLC SDUs and AMD PDUs respectively all RLC control PDUs in the transmitting side. For NR the UE in response to receiving an RLC re-establishment indication will discard the data in the RLC layer and reset the state variables. Further details about the RLC re-establishment procedure can be found e.g. in TS38.322.

According to further embodiments, the UE will in response to the receiving the message flush the HARQ buffer and perform a MAC reset. The reason for the reset is to clear off MAC PDUs, which are using the old security key configuration.

However, a MAC reset will typically cause disruption to not just the bearer of concern with key change but also other bearers and SRB(s) as well which are not affected by the key change. Therefore according to another embodiment, the UE will only flush those HARQ transmission buffers, which contain data of the radio bearer for which a change of the security key(s) is indicated in the signaling message and not perform a MAC reset. According to another embodiment, UE indicates to the NE, the process IDs of the flushed HARQ Tx buffer(s). NE may not schedule any further retransmissions for that HARQ processes but rather schedule new initial transmissions. The HARQ process ID indication may be signaled in the response to the RRC message which orders the UE to change the security key(s) of a radio bearer, e.g. RRC connection reconfiguration complete message. According to another embodiment, UE sends a new Transport Block (TB) (initial transmission) in response to receiving a retransmission grant for a HARQ process that was flushed due to security key change procedure.

According to another embodiment, the UE will not perform a MAC reset in response to changing the security key(s) of a radio bearer. PDCP transmitter may inform the PDCP receiver of the COUNT value respectively sequence number of the first PDCP SDU ciphered with the new security key after re-establishment. This information is according to certain embodiments sent in a MAC control element or PDCP control element to the receiving side. Alternatively, the COUNT information is sent in the RRC response message to the RRC message ordering the security key change, such as an RRC connection reconfiguration complete message/RRC key refresh complete message.

Figure 7:
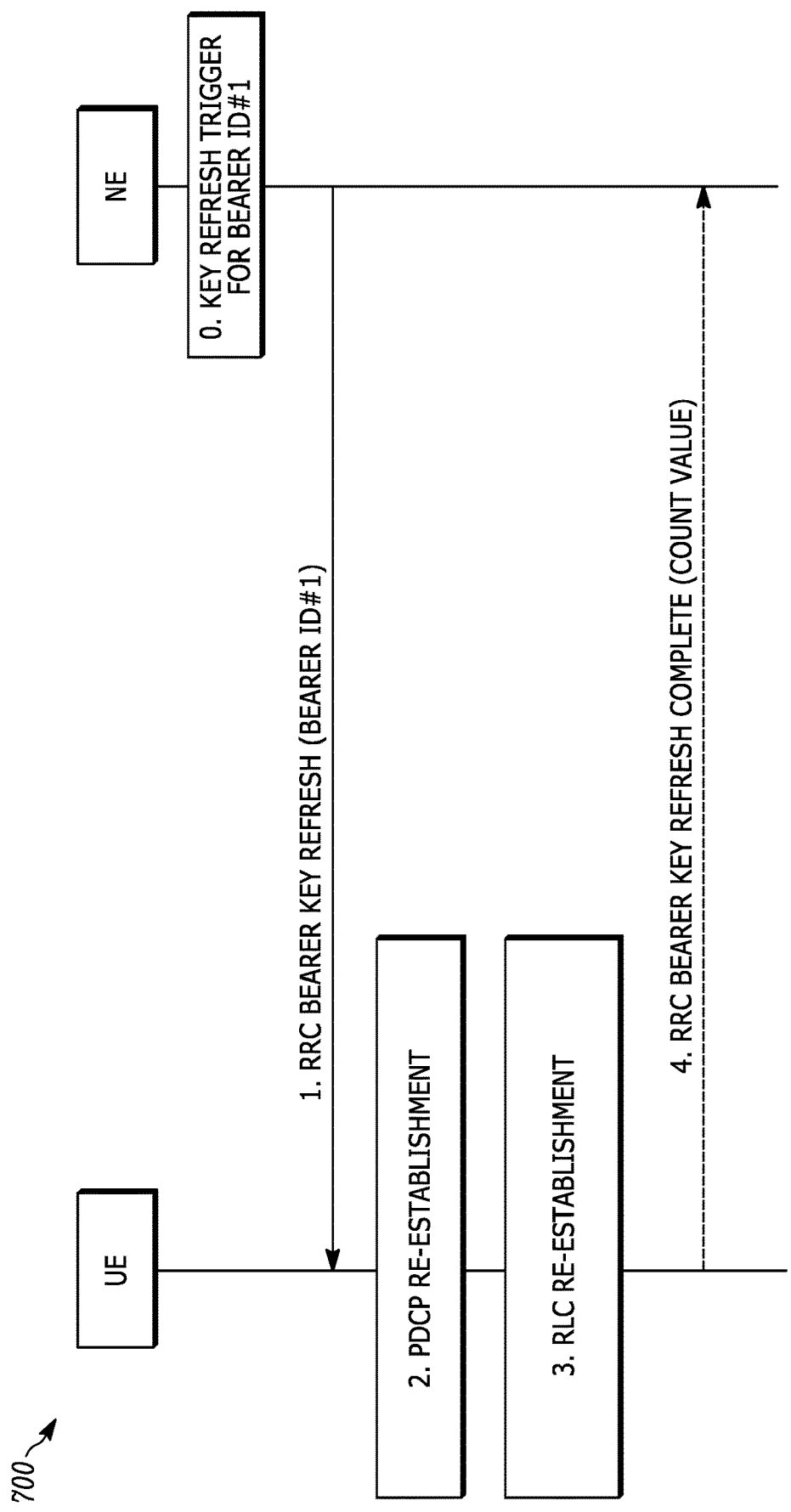
FIG. 7 is a message sequence diagram for changing the security key(s) for a radio bearer, in accordance with at least a still further embodiment.

FIG. 7 illustrates a message sequence diagram 700 for changing the security key(s) for a radio bearer, in accordance with at least a still further embodiment of the present application.

According to other embodiments, the UE will trigger a buffer status report in response to changing the security key(s) of a radio bearer. In particular for the case that the security key(s) of a radio bearer are changed by releasing the radio bearer and adding a new radio bearer, a packet loss may occur, i.e., data stored in the (re)transmission buffer in the PDCP/RLC layer are flushed. In consequence, the buffer status of the UE is changing. Therefore, it would be beneficial to inform the NE about the changed buffer status in order to allow for efficient future scheduling.

According to yet another embodiment, the UE will in response to receiving an indication to change the security key(s) of a radio bearer cancel scheduling request(s) and/or buffer status report(s) triggered due to data becoming available for transmission for the logical channel associated to the radio bearer for which security key(s) are to be changed.

According to one embodiment, the UE will trigger a PDCP status report in response to changing the security key(s) of a radio bearer. The status report contains information on the successful received PDCP SDUs prior to the security key(s) change.

According to another embodiment, the UE will in response to receiving an order from network to perform a security key change/refresh for a radio bearer perform an intra-cell handover procedure for that indicated radio bearer without applying a MAC reset.

The multiple embodiments above disclose methods for the user plane/layer 2 behavior performed at security key change for one particular radio bearer. In case of handover, this procedure could be applied for all configured radio bearers which are to be handed over.

Figure 8:
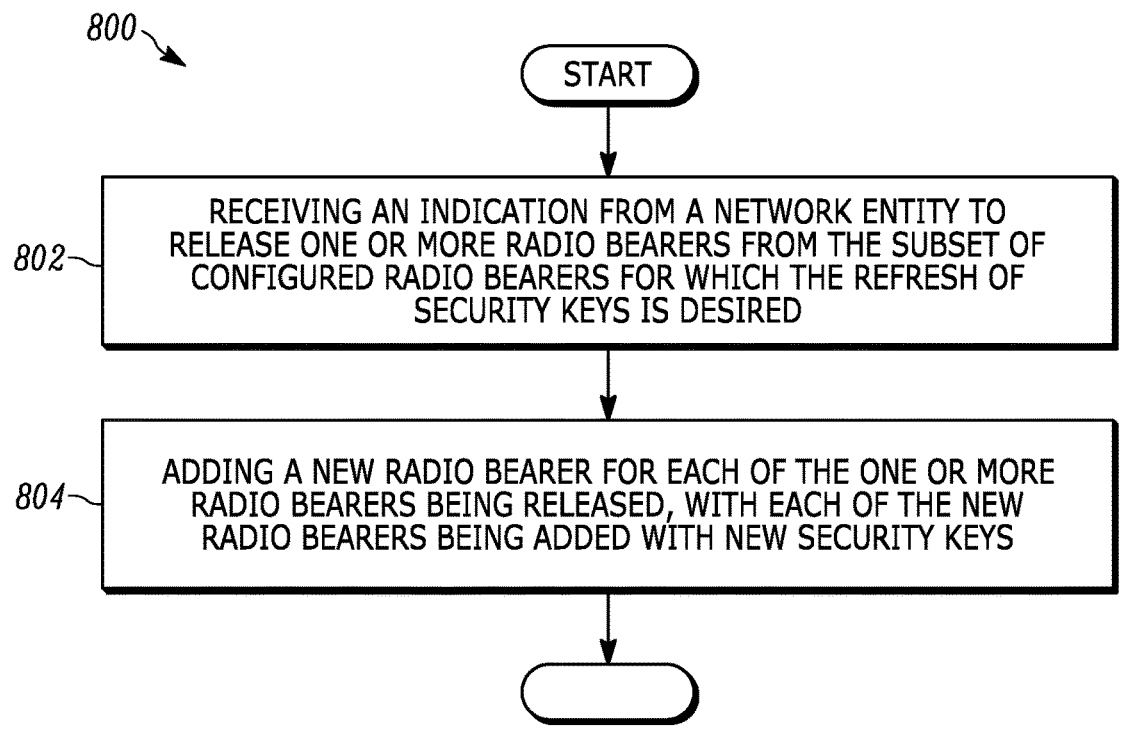
FIG. 8 is a flow diagram of a method in a user equipment to refresh the security keys of a subset of configured radio bearers.

FIG. 8 illustrates a flow diagram 800 of a method in a user equipment to refresh the security keys of a subset of configured radio bearers. More specifically, a method in a user equipment to refresh the security keys of a subset of configured radio bearers including less than all of the currently configured radio bearers is provided. The method includes receiving 802 an indication from a network entity to release one or more radio bearers from the subset of configured radio bearers for which the refresh of security keys is desired. The method further includes adding 804 a new radio bearer for each of the one or more radio bearers being released. Each of the new radio bearers is added with new security keys.

In some instances, adding a new radio bearer can be in response to a message from the network entity. In some of these instances, the message for adding a new radio bearer can be part of the indication received from the network entity to release the one or more radio bearers. In some of these or other instances, the message from the network entity prompting the addition of the new radio bearer can include security relevant parameters that are used in deriving the new security keys.

In some instances, each radio bearer can have an associated logical channel identity, and a logical channel identity associated with the radio bearer being added can be different than a logical channel identity associated with the radio bearer being released. In some of these instances, a configuration of the radio bearer being added can be the same as a configuration of the related radio bearer being released.

In some instances, upon release of a particular radio bearer, any subsequently received information for the particular radio bearer that had been released can be discarded.

In some instances, the new radio bearer is added before the related radio bearer being removed is released.

In some instances, each radio bearer can have a related packet data convergence protocol entity. In some of these instances, the packet data convergence protocol entity of the radio bearer being released, prior to being released, may decipher already received and processed information from the information flow, which has not yet been acknowledged as having been received, and may transfer the deciphered information to the packet data convergence protocol entity of the new related radio bearer being added in ascending order of an associated count value, treating the deciphered information as newly arrived information via the new related radio bearer being added. In some of these or other instances, any information in a transmit buffer of a transmitter of the packet data convergence protocol entity of the radio bearer being released, which has not been acknowledged as having been received, may be processed again using the new security keys of the new related radio bearer being added, and the information that has been processed again can be retransmitted.

In some instances, data of a radio bearer can be stored in one or multiple hybrid automatic repeat request buffer, where when the indication from the network to release one or more radio bearers from the subset of configured radio bearers is received, the hybrid automatic repeat request buffer in which data of the to be released radio bearers can be flushed. In some of these instances, a retransmission request for a hybrid automatic repeat request buffer that was flushed can be treated by the user equipment as a trigger for sending an initial transmission using the new security keys of the new radio bearer being added, which is related to the radio bearer being released.

In some instances, a count value or a sequence number of a first packet or information processed using the new security keys for a radio bearer can be sent to signal a transition between the use of the old security keys used for the radio bearer, and the new security keys used for this radio bearer.

Figure 9:
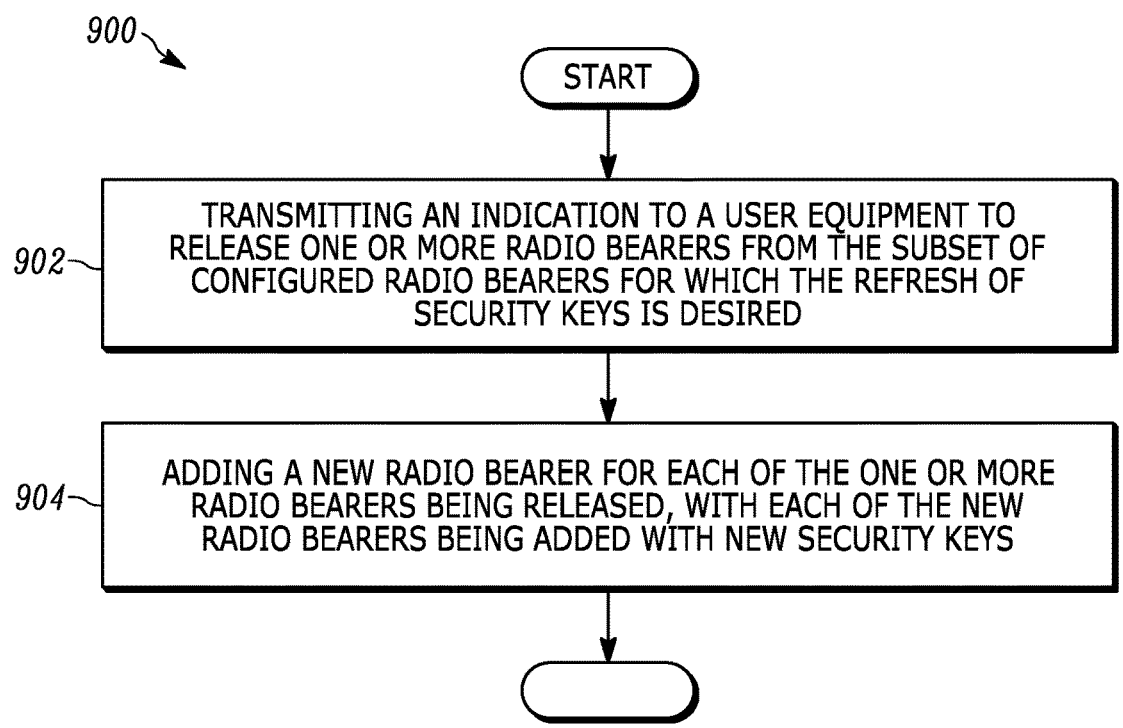
FIG. 9 is a flow diagram of a method in a network entity to refresh the security keys of a subset of configured radio bearers.

FIG. 9 illustrates a flow diagram 900 of a method in a network entity to refresh the security keys of a subset of configured radio bearers. More specifically, a method in a network entity to refresh the security keys of a subset of configured radio bearers including less than all of the currently configured radio bearers is provided. The method includes transmitting 902 an indication to a user equipment to release one or more radio bearers from the subset of configured radio bearers for which the refresh of security keys is desired. The method further includes adding 904 a new radio bearer for each of the one or more radio bearers being released. Each of the new radio bearers is added with new security keys.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 10:
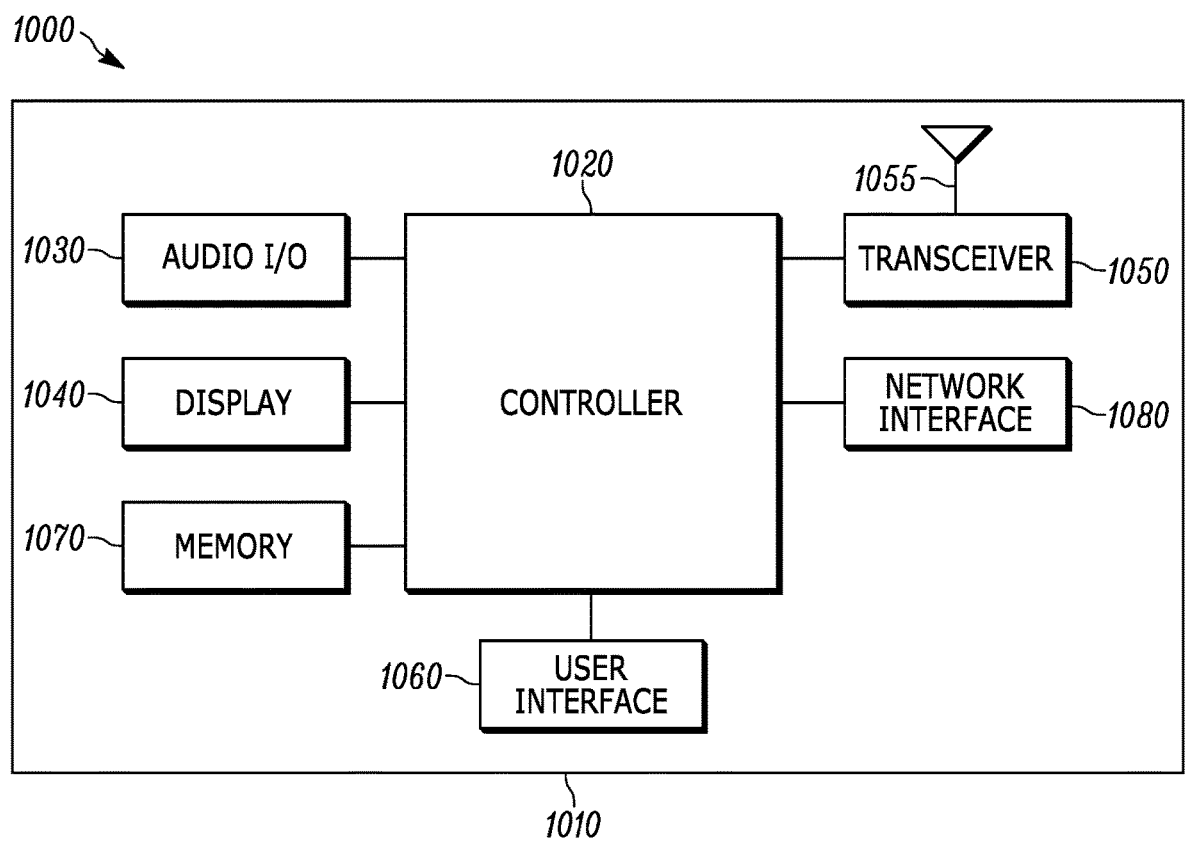
FIG. 10 is an example block diagram of an apparatus according to a possible embodiment.

FIG. 10 is an example block diagram of an apparatus 1000, such as the wireless communication device 110, according to a possible embodiment. The apparatus 1000 can include a housing 1010, a controller 1020 within the housing 1010, audio input and output circuitry 1030 coupled to the controller 1020, a display 1040 coupled to the controller 1020, a transceiver 1050 coupled to the controller 1020, an antenna 1055 coupled to the transceiver 1050, a user interface 1060 coupled to the controller 1020, a memory 1070 coupled to the controller 1020, and a network interface 1080 coupled to the controller 1020. The apparatus 1000 can perform the methods described in all the embodiments The display 1040 can be a viewfinder, a liquid crystal display (LCD), a light emitting diode (LED) display, a plasma display, a projection display, a touch screen, or any other device that displays information. The transceiver 1050 can include a transmitter and/or a receiver. The audio input and output circuitry 1030 can include a microphone, a speaker, a transducer, or any other audio input and output circuitry. The user interface 1060 can include a keypad, a keyboard, buttons, a touch pad, a joystick, a touch screen display, another additional display, or any other device useful for providing an interface between a user and an electronic device. The network interface 1080 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1070 can include a random access memory, a read only memory, an optical memory, a solid state memory, a flash memory, a removable memory, a hard drive, a cache, or any other memory that can be coupled to an apparatus.

The apparatus 1000 or the controller 1020 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1070 or elsewhere on the apparatus 1000. The apparatus 1000 or the controller 1020 may also use hardware to implement disclosed operations. For example, the controller 1020 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1020 may be any controller or processor device or devices capable of operating an apparatus and implementing the disclosed embodiments. Some or all of the additional elements of the apparatus 1000 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment to refresh security keys of a subset of configured radio bearers including less than all of the configured radio bearers which are currently configured, the method comprising:
    receiving an indication from a network entity to release one or more radio bearers from the subset of configured radio bearers for which the refresh of the security keys is desired; and
    adding a new radio bearer for each one of the one or more radio bearers being released, where each one of the new radio bearers being added has new security keys; and
    wherein the new radio bearer is added before the radio bearer being released, that is associated with the new radio bearer being added, is released.

2. The method in accordance with claim 1, wherein adding the new radio bearer is in response to a message from the network entity.

3. The method in accordance with claim 2, wherein the message for adding the new radio bearer is part of the indication received from the network entity to release the one or more radio bearers.

4. The method in accordance with claim 2, wherein the message from the network entity prompting the addition of the new radio bearer includes security relevant parameters that are used in deriving the new security keys.

5. The method in accordance with claim 1, wherein each radio bearer has an associated logical channel identity, and wherein the logical channel identity associated with the new radio bearer being added is different than the logical channel identity associated with the radio bearer being released, that is associated with the new radio bearer being added.

6. The method in accordance with claim 5, wherein a configuration of the new radio bearer being added is the same as a configuration of the radio bearer being released, that is associated with the new radio bearer being added.

7. The method in accordance with claim 1, wherein upon receiving data for a radio bearer with an associated logical channel identity not configured, discarding the received data for that particular radio bearer.

8. The method in accordance with claim 1, wherein each one of the radio bearers has a related packet data convergence protocol entity.

9. The method in accordance with claim 8, wherein the related packet data convergence protocol entity of the radio bearer being released, prior to being released, deciphers already received and processed information from the information flow, which has not yet been acknowledged as having been received, and transfers the deciphered information to the related packet data convergence protocol entity of the new radio bearer being added, in ascending order of an associated count value, treating the deciphered information as newly arrived information via the new radio bearer being added.

10. The method in accordance with claim 1, wherein each one of the radio bearers has a hybrid automatic repeat request buffer, where the hybrid automatic repeat request buffer is flushed when the indication from the network to release the one or more radio bearers from the subset of the configured radio bearers is received.

11. The method in accordance with claim 10, wherein a retransmission request, related to a hybrid automatic repeat request for information that was flushed from the hybrid automatic repeat request buffer related to the radio bearer being released, will be treated by the user equipment as a new transmission using the new security keys of the new radio bearer being added.

12. A method in a user equipment to refresh security keys of a subset of configured radio bearers including less than all of the configured radio bearers which are currently configured, the method comprising:
    receiving an indication from a network entity to release one or more radio bearers from the subset of configured radio bearers for which the refresh of the security keys is desired; and
    adding a new radio bearer for each one of the one or more radio bearers being released, where each one of the new radio bearers being added has new security keys;

wherein each radio bearer has a related packet data convergence protocol entity; and wherein any information in a transmit buffer of a transmitter of the related packet data convergence protocol entity of the radio bearer being released, which has not been acknowledged as having been received, will be processed again using the new security keys of the new radio bearer being added which is related to the radio bearer being released, and the information that has been processed again will be retransmitted.

13. A user equipment to refresh security keys of a subset of configured radio bearers including less than all of the configured radio bearers which are currently configured, the user equipment comprising:
a transceiver that receives an indication from a network entity to release one or more radio bearers from the subset of configured radio bearers for which the refresh of the security keys is desired; and
a controller that adds a new radio bearer for each one of the one or more radio bearers being released, where each one of the new radio bearers being added has new security keys; and
wherein the new radio bearer is added before the related radio bearer being released, that is associated with the new radio bearer being added, is released.

14. The user equipment in accordance with claim 13, wherein the controller adds the new radio bearer, in response to the transceiver receiving a corresponding message from the network entity.

15. The user equipment in accordance with claim 14, wherein the message for adding the new radio bearer is part of the indication received from the network entity to release the one or more radio bearers.

16. The user equipment in accordance with claim 13, wherein each one of the radio bearers has a related packet data convergence protocol entity.

17. The user equipment in accordance with claim 16, wherein the related packet data convergence protocol entity of the radio bearer being released, prior to being released, deciphers already received and processed information from the information flow, which has not yet been acknowledged as having been received, and transfers the deciphered information to the related packet data convergence protocol entity of the new radio bearer being added, in ascending order of an associated count value, treating the deciphered information as newly arrived information via the new radio bearer being added.

* * * * *